United States Patent
Smith (10) Patent No.: US 9,001,122 B1
(45) Date of Patent: Apr. 7, 2015

(54) SYSTEM FOR USING ANGLE-WEIGHTED NORMALS AND FLOOD-FILLING IN GEOMETRIC MODELING

(75) Inventor: Jeffrey D. Smith, San Francisco, CA (US)

(73) Assignee: Lucasfilm Entertainment Company Ltd., San Francisco, CA (US)

( * ) Notice: Subject to any disclaimer, the term of this patent is extended or adjusted under 35 U.S.C. 154(b) by 313 days.

(21) Appl. No.: 13/565,596

(22) Filed: Aug. 2, 2012

Related U.S. Application Data (60) Provisional application No. 61/583,026, filed on Jan. 4, 2012.

(51) Int. Cl.
  *G06T 17/00* (2006.01)
  *G06T 15/00* (2011.01)
  *G06K 9/00* (2006.01)

(52) U.S. Cl.
  CPC .................................. *G06K 9/00281* (2013.01)

(58) Field of Classification Search
  CPC combination set(s) only.
  See application file for complete search history.

(56) References Cited

U.S. PATENT DOCUMENTS

| | | | |
|---|---|---|---|
| 6,600,965 B1 * | 7/2003 | Hull et al. ..................... | 700/120 |
| 2008/0143712 A1 * | 6/2008 | McBagonluri et al. ....... | 345/420 |

OTHER PUBLICATIONS

Baerentzen, et al. "Signed Distance Computation Using the Angle Weighted Pseudo-normal," IEEE Transactions on Visualization and Computer Graphics, vol. 11, Issue 3, May 2005, 13 pages.

* cited by examiner

*Primary Examiner* — Leon T Cain, II
(74) *Attorney, Agent, or Firm* — Kilpatrick Townsend & Stockton LLP (57) ABSTRACT

A first geometry and a second geometry are accessed. They are positioned so that the first geometry and the second geometry at least in part intersect. The first geometry is divided into portions based on the intersection with the second geometry. At least a first portion of the first geometry is classified as being on one side of the second geometry. At least a second portion of the first geometry is classified as being on another side of the second geometry. At least a third portion of the first geometry is unclassified. The classifying includes comparing an angle weighted normal of a face with a property of the second geometry. The third portion is reclassified as either above the second geometry or below the second geometry according to the classification of a neighboring portion.

20 Claims, 7 Drawing Sheets

SYSTEM FOR USING ANGLE-WEIGHTED NORMALS AND FLOOD-FILLING IN GEOMETRIC MODELING

CROSS-REFERENCE TO RELATED APPLICATIONS

This application claims priority to U.S. Application Ser. No. 61/583,026, filed on Jan. 4, 2012, the contents which are hereby incorporated by reference.

TECHNICAL FIELD

This document relates to object modeling.

BACKGROUND

Frequently, a special effects shots or sequences will involve some object being torn apart, ripped or otherwise broken. This operation is usually called "fracturing." Additionally or alternatively, some operations require creating models of objects with complex surfaces. One process for creating these models is called constructive solid geometry (CSG). In CSG, a modeler can combine shapes with Boolean logic to create a new shape.

SUMMARY

In one aspect, a method includes accessing a first geometry and a second geometry. The method further includes positioning the first geometry and the second geometry so that the first geometry and the second geometry at least in part intersect. The method further includes dividing the first geometry into portions based on the intersection with the second geometry. The method further includes classifying at least a first portion of the first geometry as being on one side of the second geometry, classifying at least a second portion of the first geometry as being on another side of the second geometry, and classifying at least a third portion of the first geometry as unclassified, the classifying includes comparing an angle weighted normal of a face with a property of the second geometry. The method further includes reclassifying the third portion as either above the second geometry or below the second geometry according to the classification of a neighboring portion.

Implementations can include any, all, or none of the following features. The method further includes generating a third geometry from the portions classified as above the second geometry and a fourth geometry from the portions classified as below the second geometry. The method including replacing the first geometry with the third and fourth geometry in a virtual environment. The first geometry is procedurally created. The method including generating a third geometry from one or more portions classified as above the second geometry, from one or more portions classified as below the second geometry, and from the second geometry. The method including replacing the first geometry with the third geometry in a virtual environment. Dividing the first geometry into portions creates new faces of the first geometry where the first geometry and the second geometry intersect, the method further including generating a third geometry from either the new faces classified as above the second geometry or the new faces classified as below the second geometry. The method including replacing the first geometry with the third geometry in a virtual environment.

In one aspect, a computer-readable medium having stored therein instructions that when executed perform a method that includes accessing a first geometry and a second geometry. The method further includes positioning the first geometry and the second geometry so that the first geometry and the second geometry at least in part intersect. The method further includes dividing the first geometry into portions based on the intersection with the second geometry. The method further includes classifying at least a first portion of the first geometry as being on one side of the second geometry, classifying at least a second portion of the first geometry as being on another side of the second geometry, and classifying at least a third portion of the first geometry as unclassified, the classifying includes comparing an angle weighted normal of a face with a property of the second geometry. The method further includes reclassifying the third portion as either above the second geometry or below the second geometry according to the classification of a neighboring portion.

Implementations can include any, all, or none of the following features. The method further includes generating a third geometry from the portions classified as above the second geometry and a fourth geometry from the portions classified as below the second geometry. The method includes replacing the first geometry with the third and fourth geometry in a virtual environment. The first geometry is procedurally created. The method further includes generating a third geometry from one or more portions classified as above the second geometry, from one or more portions classified as below the second geometry, and from the second geometry. The method including replacing the first geometry with the third geometry in a virtual environment. Dividing the first geometry into portions creates new faces of the first geometry where the first geometry and the second geometry intersect, the method further including generating a third geometry from either the new faces classified as above the second geometry or the new faces classified as below the second geometry. The method includes replacing the first geometry with the third geometry in a virtual environment.

In one aspect, a system includes one or more processors. The system further includes a computer-readable medium having stored therein instructions that when executed perform a method includes accessing a first geometry and a second geometry. The method further includes positioning the first geometry and the second geometry so that the first geometry and the second geometry at least in part intersect. The method further includes dividing the first geometry into portions based on the intersection with the second geometry. The method further includes classifying at least a first portion of the first geometry as being on one side of the second geometry, classifying at least a second portion of the first geometry as being on another side of the second geometry, and classifying at least a third portion of the first geometry as unclassified, the classifying includes comparing an angle weighted normal of a face with a property of the second geometry. The system further includes reclassifying the third portion as either above the second geometry or below the second geometry according to the classification of a neighboring portion. A system includes one or more processors.

Implementations can include any, all, or none of the following features. The method further includes generating a third geometry from the portions classified as above the second geometry and a fourth geometry from the portions classified as below the second geometry; and replacing the first geometry with the third and fourth geometry in a virtual environment. The method further includes generating a third geometry from one or more portions classified as above the second geometry, from one or more portions classified as below the second geometry, and from the second geometry; and replacing the first geometry with the third geometry in a virtual environment. Dividing the first geometry into portions creates new faces of the first geometry where the first geometry and the second geometry intersect. The method further includes generating a third geometry from either the new faces classified as above the second geometry or the new faces classified as below the second geometry; and replacing the first geometry with the third geometry in a virtual environment.

The system described here can perform fracture operations, and can be used for modeling the fragments of destroyed objects. Angle-weighted normals, whether pre-computed or not, can be used in the decision on whether a particular face is above the cutting surface or below it. This use can prevent or minimize missing or erroneous face classifications that would have to be fixed by hand by an artist. A flood-fill algorithm can be used to further reduce error by leveraging the connectivity information from meshes

DESCRIPTION OF DRAWINGS

Like reference symbols in the various drawings indicate like elements

DETAILED DESCRIPTION

Systems and processes described here can operate on any arbitrary geometry, including geometric meshes. The meshes need not be closed—sometimes called watertight. The meshes need not be manifold—such that no edge is shared between more than two faces. Additionally, the meshes can be are arbitrarily large, complex, or contain arbitrarily small faces. The mesh shapes may be explicitly defined (e.g., a mesh of vertices, edges, and faces), implicitly defined (e.g., with surfaces described in relation to other shapes), and/or generated programmatically (e.g., a mesh created by the execution of a procedure or function) The system can use the normals of each mesh to determine what portions of the other mesh are inside (or beneath) or outside (or above) the first mesh. In some implementations, angle weighted normals can be calculated for this process. The angle weighted normal technique can provide accurate, smoothly varying normals across the whole surface, including at edges and points. The faces that were cut during an intersection (which can be easily classified as "above" or "below" the face that cut them) can be used as input to flood-fill the "aboveness" or "belowness" values of other, connected faces.

The processes described in these examples are pieces of larger mechanisms for performing constructive solid geometry ("CSG") on meshes. With no loss of generality, we will first discuss fracture (also referred to as a CSG difference), but all the processes described here can be used with union and intersection operations discussed later instead or as well.

These operations may be used in, for example, computer graphics, animation, film special effects, medical imaging, computer aided drafting, and computer numerically control machining.

Figure 1:
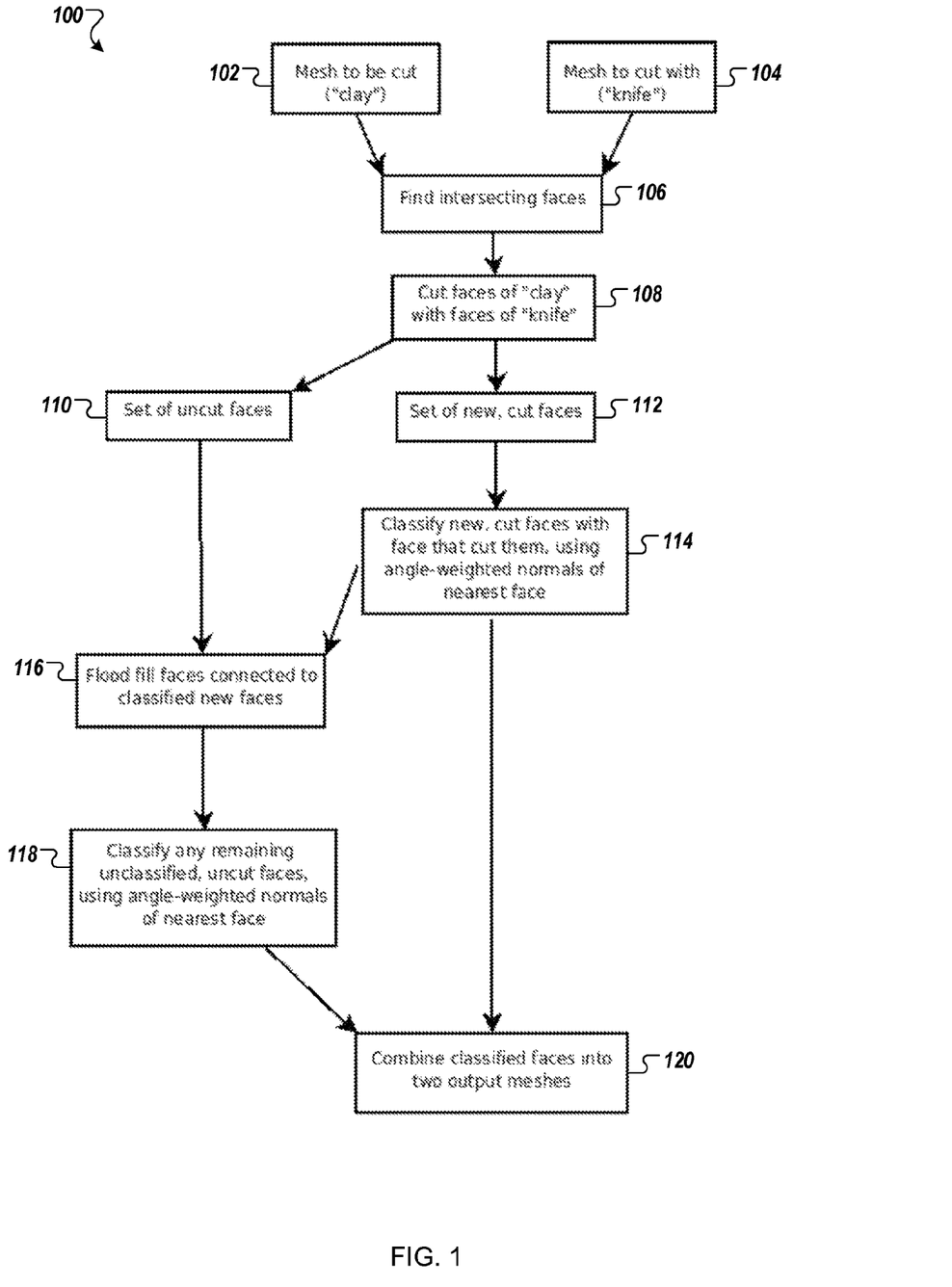
FIG. 1 shows an example process for creating two shapes from one source shape.

FIG. 1 shows an example process 100 for creating two shapes from one source shape. A first geometry to be fractured is designated (102) as a "clay" geometry and a second geometry is designated (104) as a "knife" geometry. Conceptually, the clay geometry can be thought of as cut by the knife geometry, similar to how a real knife can cut a real block of clay. To perform the cutting, all intersecting faces of the clay and knife geometry ar found 106, and the intersecting faces are cut 108 along the lines of intersection. Faces of the clay geometry that are not cut are identified 110 as a set of uncut faces.

Once a face on the clay geometry has been cut (108) in two or more parts by one or more knife faces, the parts, or faces, of the clay can be determined to be either above or below the knife mesh. The faces above and below the knife are used to create two new geometries that result from cutting the original clay. To accomplish this, the closest point on the knife mesh can be found for each vertex of the cut face, plus one for its centroid. In some implementations, only triangular fragments are created by the cutting, so the centroid can be guaranteed to be internal to the face. It is then determined if these four closest points lie on edges of the knife, are exactly vertices of the knife, or lie in the interior of a knife face. The point's normal can be calculated, or, for example, this location information can be used to look into the pre-computed array of angle-weighted normal for each edge and each vertex of the original clay mesh to determine that point's normal. Normals for the faces can be computed by any appropriate technique, such as by the right hand rule, and these face-normals may be used to compute angle weighted normal of the edges and vertices. This normal can be used to determine if the querying vertex on the clay face is above or below the closest point on the knife mesh 114. (i.e., if its location has a positive or negative dot product with respect to the normal). In a case of disagreement "aboveness" or "belowness" is decided by voting by the four vertices. If voting is tied, the face can be considered unclassified and can be handled it in a subsequent step. In some implementations, the voting process can fail to reliably produce a reliable result. For example, the size of a face may be so small that the precision required to accurately map the location of a point is greater than the precision of the computer system performing these calculations. In these cases, such faces may also be considered unclassified.

At this point a set of unclassified faces (some uncut 110, some cut 112), a set of classified faces (all cut), and prior knowledge of the faces' connectivity (i.e. which faces share edges with which other faces, cut and uncut) are known. Starting from a classified cut face, the process recursively flood-fills connected faces 116, classifying each as it goes. That is, an unclassified face bordering a classified face is assigned the property of the classified face, and in turn becomes a classified face. If another cut face is encountered, that "branch" of the recursion stops (in this way crossing the cut boundary and misclassifying one half of the cut object can be prevented). This process can be repeated, with faces of both classifications, until no more connected faces are unclassified.

It is possible that at this point there remain islands of faces, unconnected to the rest of the mesh that are unclassified. To classify these faces, the angle-weighted-normal classification process is repeated for the island and the recursive flood-fill of a subsequent step can be repeated 118. For the repeated flood-fill, the first face to be processed can be selected arbitrarily, or based on one or more heuristic rules. For example, a large and/or equilateral face may be used as the first face. The classified faces are combined into two output meshes according to their classification 120.

Figure 2:
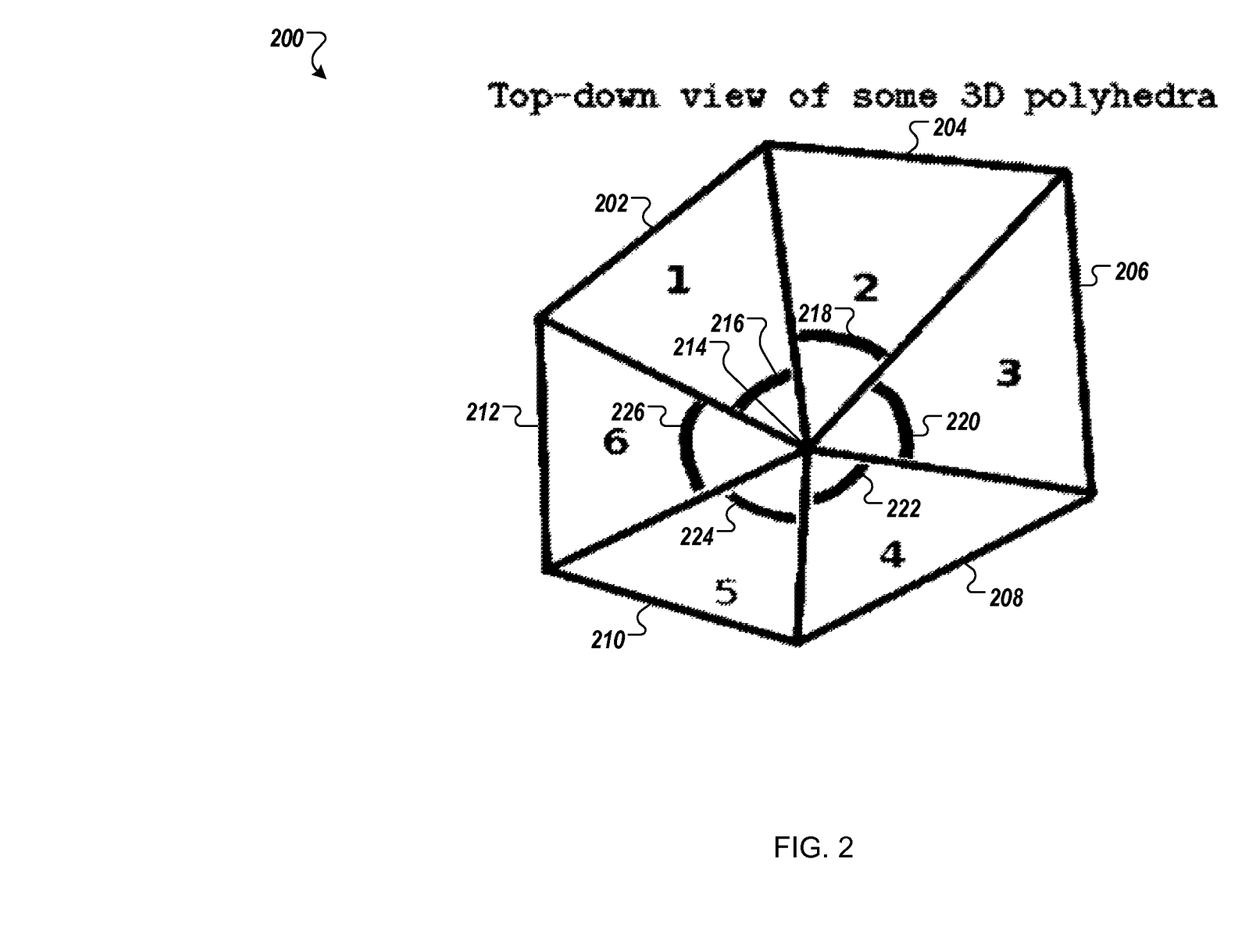
FIG. 2 shows an example geometry used to calculate an angle weighted normal.

FIG. 2 shows an example geometry used to calculate an angle weighted normal. Shown is a mesh-defined 3D object 200, viewed from above. These six faces 202-212 all share a common vertex 214, for which a normal can be calculated. For example, the 3D object may be a clay geometry being cut with a knife geometry in the process of FIG. 1. The normal of each face 202-212 (n1, n2, n3 . . . ) can be found and multiplied each by the angle 216-226 (in *radians* or degrees) subtended by that triangle at the vertex in question (shown as arcs). Then this summed vector can be divided by the total of all the angles 216-226:

$$\text{vertex normal} = (n1*\text{angle1} + n2*\text{angle2} + \ldots + n6*\text{angle6})/(\text{angle1} + \text{angle2} + \ldots + \text{angle6})$$

In this way, faces that contribute less geometrically to the shape of the surface at the point in question can be made to contribute proportionally less to the angle-weighted normal. The same technique can be used to compute the angle-weighted normal on one of the edges.

Figure 3:
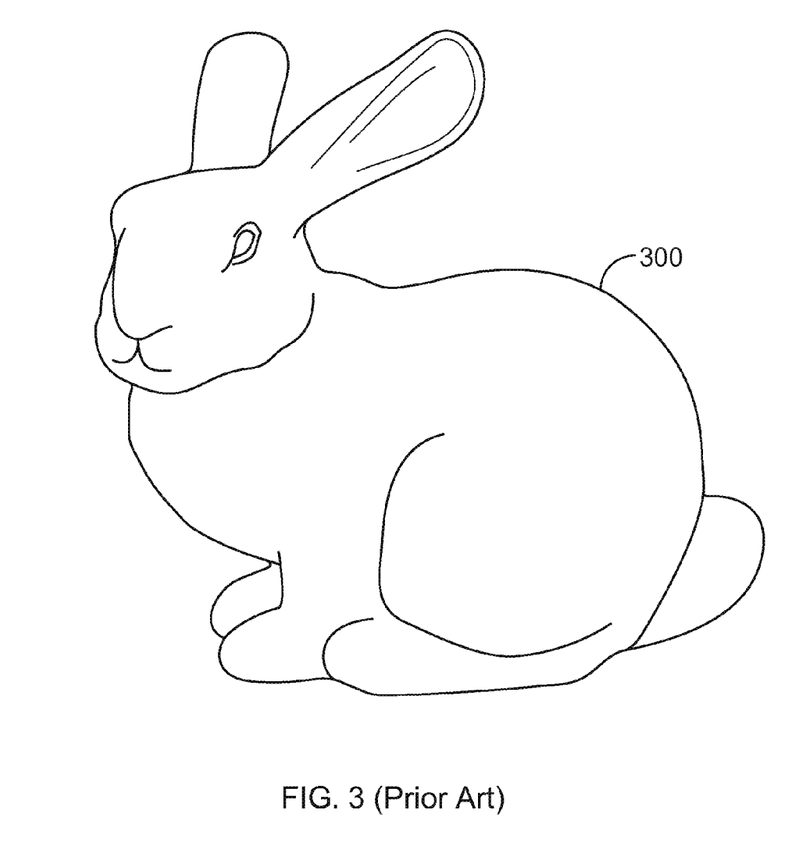
FIG. 3 shows the "Stanford Bunny" model before being cut.

FIG. 3 shows the "Stanford Bunny" model 300 before being cut. The model 300 is defined as a mesh of triangles defined in a Cartesian coordinate system. However, other coordinate systems and model data structures could be used. Alternatives include, but are not limited to, polar coordinate systems, cylindrical coordinate systems, implicitly defined models, and programmatically generated models.

Figure 4:
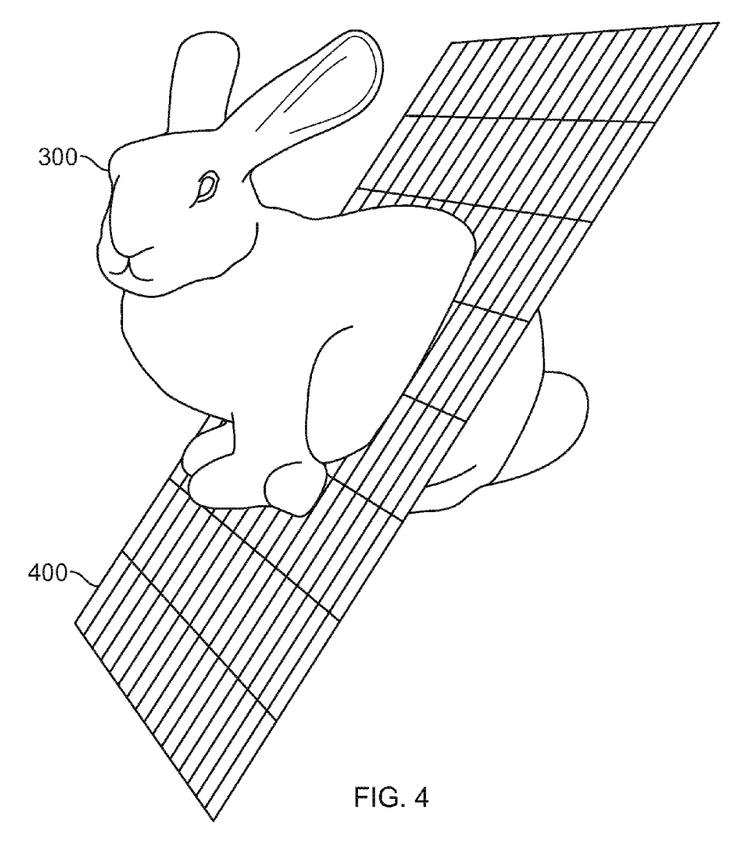
FIG. 4 shows the Stanford Bunny with a "knife" mesh set to cut the Stanford Bunny.

FIG. 4 shows the Stanford Bunny 300 with a "knife" mesh 400 set to cut the Stanford Bunny 300.

Figure 5A:
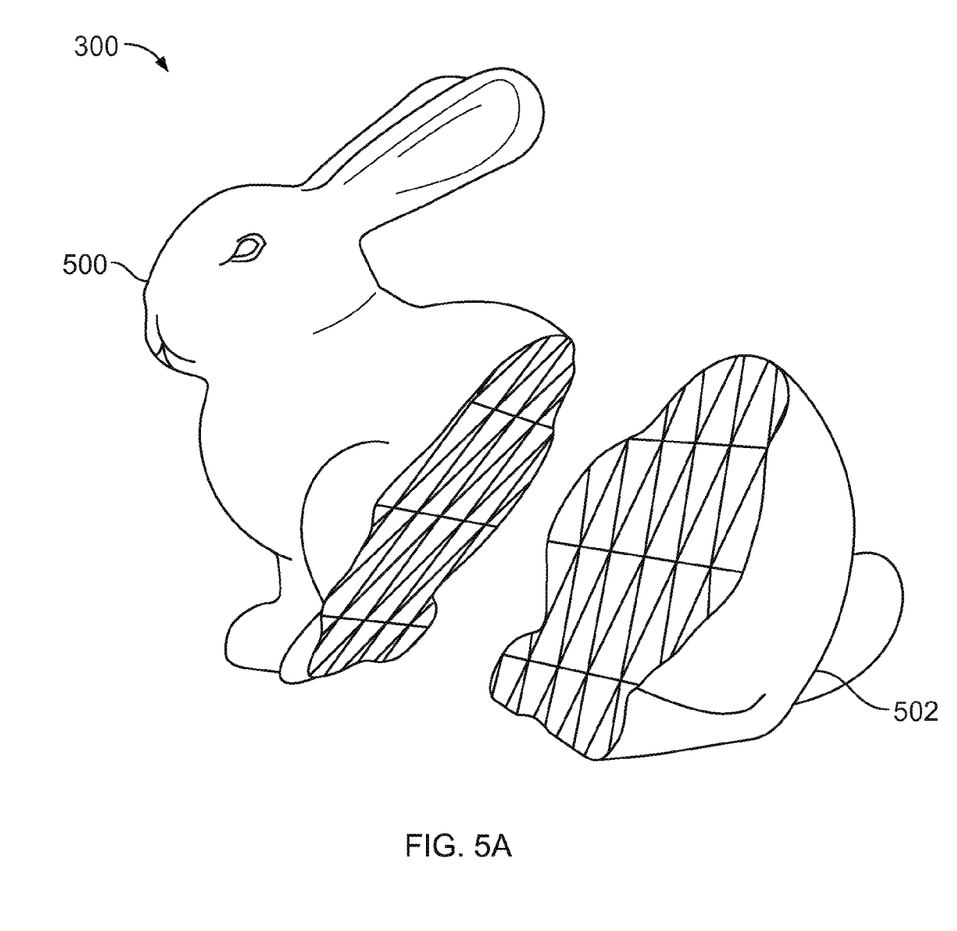
FIG. 5A shows the Stanford Bunny, cut into two pieces.

FIG. 5A shows the Stanford Bunny 300, cut into two pieces 500 and 502. The pieces have been moved and rotated slightly to show that the geometry has been smoothly cut and then made water-tight by capping the otherwise-hollow geometry.

Note that a planar grid for the cutting plane is used for illustrative purposes, but any mesh (of arbitrary density or complexity) can be used to cut.

In addition to fracturing, which is also known as cutting or a Boolean difference operation, of the Stanford Bunny model 300 with the knife mesh 400 shown in FIG. 5A, the processes described can be used to create a mesh that is the union or intersection of two or more models, here the Stanford Bunny model 300 and the knife model 400. In order to find the union, all faces of both the Stanford Bunny model 300 and the knife model 400 may be preserved and added to the same output mesh, instead of, for example, two output meshes as in operation 118 (FIG. 1). Such a union would look the same as the Stanford Bunny 300 with a "knife" mesh 400 set to cut the Stanford Bunny 300 as shown in FIG. 4, but would in fact be one unified model.

Figure 5B:
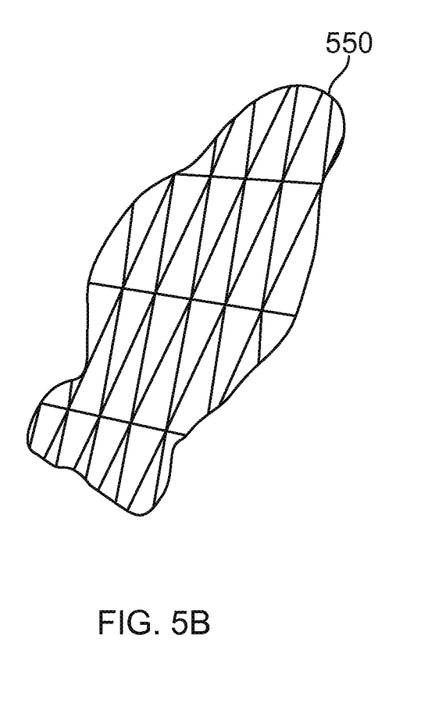
FIG. 5B shows the intersection of the Stanford Bunny and the knife mesh.

FIG. 5B shows the intersection 550 of the Stanford Bunny and the knife mesh 400. In order to find the intersection 550, only the new cut faces 110 found to be below the knife mesh 400 be added to a new output mesh, instead of, for example, adding both cut and uncut faces to two output meshes as in operation 118 (FIG. 1). In another example, the new cut faces 110 found to be above the knife mesh 400 may be used instead.

Figure 6:
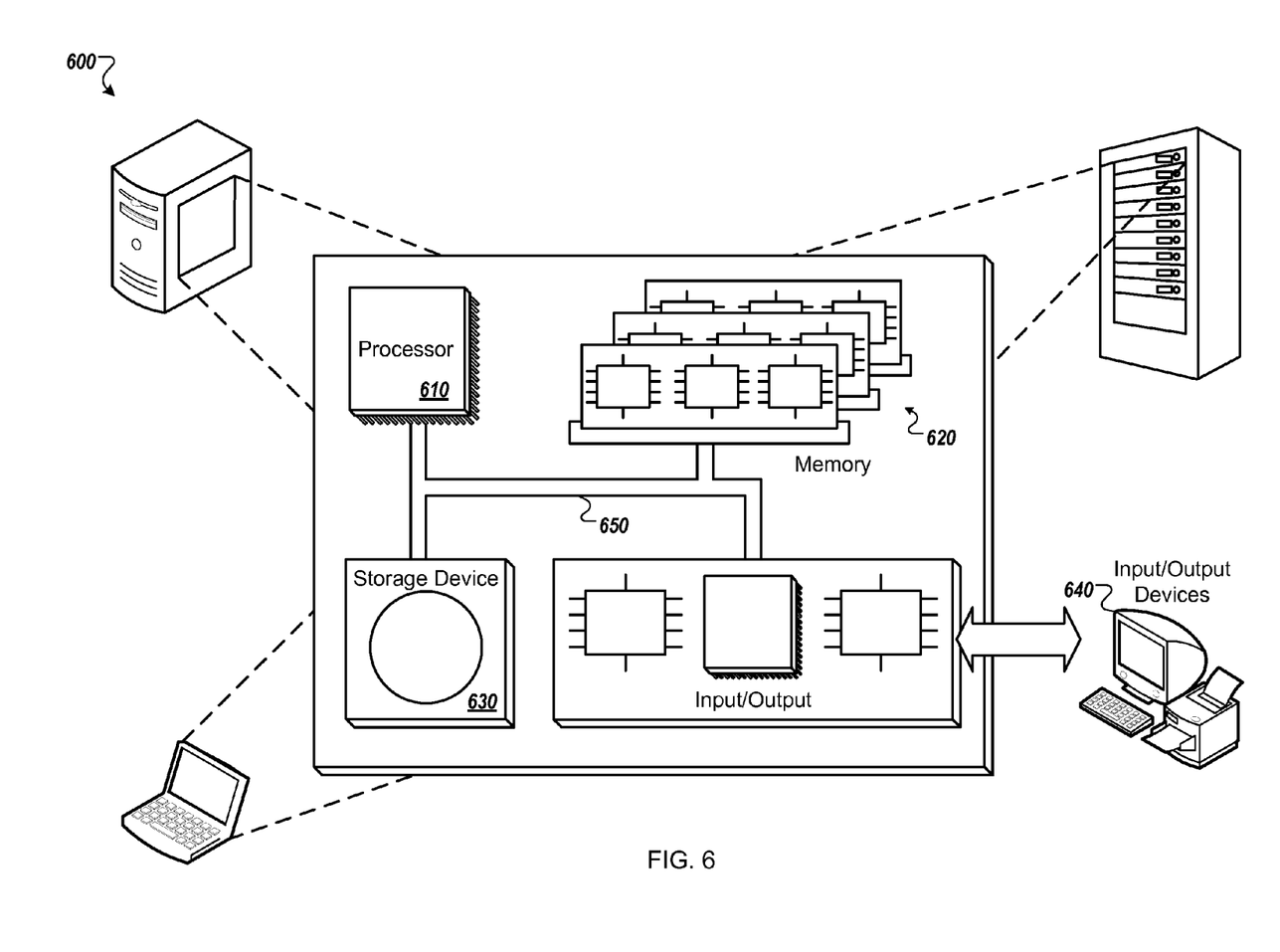
FIG. 6 is a schematic diagram that shows an example of a computing system that can be used in connection with computer-implemented methods and systems described in this document.

FIG. 6 is a schematic diagram that shows an example of a computing system 600. The computing system 600 can be used for some or all of the operations described previously, according to some implementations. The computing system 600 includes a processor 610, a memory 620, a storage device 630, and an input/output device 640. Each of the processor 610, the memory 620, the storage device 630, and the input/output device 640 are interconnected using a system bus 650. The processor 610 is capable of processing instructions for execution within the computing system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the computing system 600. In some implementations, the memory 620 is a computer-readable medium. In some implementations, the memory 620 is a volatile memory unit. In some implementations, the memory 620 is a non-volatile memory unit.

The storage device 630 is capable of providing mass storage for the computing system 600. In some implementations, the storage device 630 is a computer-readable medium. In various different implementations, the storage device 630 may be a floppy disk device, a hard disk device, an optical disk device, or a tape device.

The input/output device 640 provides input/output operations for the computing system 600. In some implementations, the input/output device 640 includes a keyboard and/or pointing device. In some implementations, the input/output device 640 includes a display unit for displaying graphical user interfaces.

Some features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASICs (application-specific integrated circuits).

To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

What is claimed is:

1. A method comprising:
   accessing a first geometry and a second geometry;
   positioning the first geometry and the second geometry so that the first geometry and the second geometry at least in part intersect;
   dividing the first geometry into portions based on the intersection with the second geometry;
   classifying at least a first portion of the first geometry as being on one side of the second geometry, classifying at least a second portion of the first geometry as being on another side of the second geometry, and classifying at least a third portion of the first geometry as unclassified, the classifying including computing a dot product of an angle weighted normal at a location of the first geometry with a vector at a location of the second geometry; and
   using a flood-fill algorithm to reclassify the third portion as either above the second geometry or below the second geometry according to the classification of a neighboring portion.

2. The method of claim 1, wherein the method further comprises:
   generating a third geometry from the portions classified as above the second geometry and a fourth geometry from the portions classified as below the second geometry.

3. The method of claim 2, further comprising replacing the first geometry with the third and fourth geometry in a virtual environment.

4. The method of claim 1, further comprising:
   generating a third geometry from one or more portions classified as above the second geometry, from one or more portions classified as below the second geometry, and from the second geometry.

5. The method of claim 4, further comprising replacing the first geometry with the third geometry in a virtual environment.

6. The method of claim 1, wherein dividing the first geometry into portions creates new faces of the first geometry where the first geometry and the second geometry intersect, the method further comprising generating a third geometry from either the new faces classified as above the second geometry or the new faces classified as below the second geometry.

7. The method of claim 6, further comprising replacing the first geometry with the third geometry in a virtual environment.

8. The method of claim 1, wherein the angle weighted normal at a vertex that is common to a plurality of faces is a weighted average of normal vectors of respective faces, the weight for each normal vector being the angle made by the respective face of the normal vector at the vertex divided by the total of all angles made by the plurality of faces at the vertex.

9. A non-transitory computer-readable medium having stored therein instructions that when executed perform a method comprising:
   accessing a first geometry and a second geometry;
   positioning the first geometry and the second geometry so that the first geometry and the second geometry at least in part intersect;
   dividing the first geometry into portions based on the intersection with the second geometry;
   classifying at least a first portion of the first geometry as being on one side of the second geometry, classifying at least a second portion of the first geometry as being on another side of the second geometry, and classifying at least a third portion of the first geometry as unclassified, the classifying including computing a dot product of an angle weighted normal at a location of the first geometry with a vector at a location of the second geometry; and
   using a flood-fill algorithm to reclassify the third portion as either above the second geometry or below the second geometry according to the classification of a neighboring portion.

10. The non-transitory computer-readable medium of claim 9, wherein the method further comprises:
    generating a third geometry from the portions classified as above the second geometry and a fourth geometry from the portions classified as below the second geometry.

11. The non-transitory computer-readable medium of claim 10, wherein the method further comprises replacing the first geometry with the third and fourth geometry in a virtual environment.

12. The non-transitory computer-readable medium of claim 9, wherein the method further comprises:
    generating a third geometry from one or more portions classified as above the second geometry, from one or more portions classified as below the second geometry, and from the second geometry.

13. The non-transitory computer-readable medium of claim 12, the method further comprises replacing the first geometry with the third geometry in a virtual environment.

14. The non-transitory computer-readable medium of claim 9, wherein dividing the first geometry into portions creates new faces of the first geometry where the first geometry and the second geometry intersect, the method further comprising generating a third geometry from either the new faces classified as above the second geometry or the new faces classified as below the second geometry.

15. The non-transitory computer-readable medium of claim 14, the method comprising replacing the first geometry with the third geometry in a virtual environment.

16. The non-transitory computer-readable medium of claim 9, wherein the angle weighted normal at a vertex that is common to a plurality of faces is a weighted average of normal vectors of respective faces, the weight for each normal vector being the angle made by the respective face of the normal vector at the vertex divided by the total of all angles made by the plurality of faces at the vertex.

17. A system comprising:
one or more processors; and
a computer-readable medium having stored therein instructions that when executed perform a method comprising:
  accessing a first geometry and a second geometry;
  positioning the first geometry and the second geometry so that the first geometry and the second geometry at least in part intersect;
  dividing the first geometry into portions based on the intersection with the second geometry;
  classifying at least a first portion of the first geometry as being on one side of the second geometry, classifying at least a second portion of the first geometry as being on another side of the second geometry, and classifying at least a third portion of the first geometry as unclassified, the classifying including computing a dot product of an angle weighted normal at a location of the first geometry with a vector at a location of the second geometry; and
  using a flood-fill algorithm to reclassify the third portion as either above the second geometry or below the second geometry according to the classification of a neighboring portion.

18. The system of claim 17, wherein the method further comprises:
  generating a third geometry from the portions classified as above the second geometry and a fourth geometry from the portions classified as below the second geometry; and
  replacing the first geometry with the third and fourth geometry in a virtual environment.

19. The system of claim 17, wherein the method further comprises:
  generating a third geometry from one or more portions classified as above the second geometry, from one or more portions classified as below the second geometry, and from the second geometry; and
  replacing the first geometry with the third geometry in a virtual environment.

20. The system of claim 17, wherein dividing the first geometry into portions creates new faces of the first geometry where the first geometry and the second geometry intersect, the method further comprising:
  generating a third geometry from either the new faces classified as above the second geometry or the new faces classified as below the second geometry; and
  replacing the first geometry with the third geometry in a virtual environment.

* * * * *